(12) United States Patent
Schlesiger et al.

(10) Patent No.: US 7,041,168 B2
(45) Date of Patent: May 9, 2006

(54) PROCESS FOR CEMENT EXTRUSION THAT MAKES USE OF CROSSLINKED CELLULOSE ADDITIVES

(75) Inventors: Hartwig Schlesiger, Bad Fallingbostel (DE); Roland Bayer, Walsrode (DE); Frank Höhl, Neuenkirchen (DE); Arne Henning Kull, Bomlitz (DE); Jürgen Engelhardt, Bad Fallingbostel (DE); Burkhard Kressdorf, Bad Fallingbostel (DE); Jörn-Bernd Pannek, Bad Fallingbostel (DE)

(73) Assignee: Wolff Cellulosics GmbH & Co.,, Walsrode (DE)

( * ) Notice: Subject to any disclaimer, the term of this patent is extended or adjusted under 35 U.S.C. 154(b) by 0 days.

(21) Appl. No.: 10/914,401

(22) Filed: Aug. 9, 2004

(65) Prior Publication Data

US 2005/0034636 A1    Feb. 17, 2005

(30) Foreign Application Priority Data

Aug. 12, 2003 (DE) ................. 103 37 011

(51) Int. Cl.
*C04B 24/10* (2006.01)
*C08L 1/08* (2006.01)
*C08L 1/28* (2006.01)

(52) U.S. Cl. .............. 106/805; 106/172.1; 106/197.01; 106/711; 106/730; 106/780; 106/795

(58) Field of Classification Search ................. 106/730, 106/780, 795, 805, 197.01, 172.1, 711
See application file for complete search history.

(56) References Cited

U.S. PATENT DOCUMENTS

| 2,978,782 | A | * | 4/1961 | Wagner ....................... 264/330 |
| 4,321,367 | A | | 3/1982 | Cheng et al. .................. 536/88 |
| 4,474,667 | A | * | 10/1984 | Block .......................... 507/114 |
| 6,755,908 | B1 | * | 6/2004 | Sasage et al. ................ 106/805 |
| 6,811,605 | B1 | * | 11/2004 | Sasage et al. ................ 106/805 |
| 6,891,034 | B1 | * | 5/2005 | Dannhorn et al. ............. 536/84 |
| 2004/0127700 | A1 | | 7/2004 | Schlesiger et al. ............ 536/95 |

FOREIGN PATENT DOCUMENTS

GB    513917    10/1939

OTHER PUBLICATIONS

Patent Abstracts of Japan Bd. 1998, Nr. 01, Jan. 30, 1998 & JP 9 249438 A (Shin ETSU Chem Co Ltd), Sep. 22, 1997.
Patent Abstracts of Japan Bd. 1998, Nr. 05, Apr. 30, 1998 & JP 10 017347 A (Shin ETSU Chem Co Ltd), Jan. 20, 1998.

* cited by examiner

*Primary Examiner*—David Brunsman
(74) *Attorney, Agent, or Firm*—Joseph C. Gil

(57) ABSTRACT

A method of preparing construction material systems is described. The process includes extruding a composition of construction materials and an irreversibly crosslinked cellulose derivative that is prepared by a particular process.

7 Claims, No Drawings

PROCESS FOR CEMENT EXTRUSION THAT MAKES USE OF CROSSLINKED CELLULOSE ADDITIVES

CROSS REFERENCE TO RELATED PATENT APPLICATION

The present patent application claims the right of priority under 35 U.S.C. § 119 (a)–(d) of German Patent Application No. 103 37 011.0, filed Aug. 12, 2003.

FIELD OF THE INVENTION

The invention relates to additives containing cellulose derivatives having gel-like properties for construction material systems, in particular for construction material systems which are extruded, to use thereof in construction material systems and also to a process for cement extrusion using these additives.

BACKGROUND OF THE INVENTION

Cellulose derivatives, on account of their excellent properties and their physiological safety, have versatile uses, for example as thickeners, adhesives, binders, dispersants, water-retention agents, protective colloids, stabilizers and also as suspension, emulsifying and film-forming media.

A field of application for cellulose derivatives which is of particular interest here is the extrusion of construction material systems. The extrusion of construction material systems such as cementitious systems and fibrous cementitious systems is broadly used for producing slabs and profiles for walls, roofs, floors, etc. Hereinafter this procedure will be termed cement extrusion.

Cement extrusion is a process for shaping pasty cement-containing mixtures into any desired profiles by pressing through a die mouth. The elements obtained in this manner may be used in a versatile manner, in particular in construction applications. Here, firstly they can replace cement masses which have been cast hitherto; secondly, they can render accessible profile shapes which are not accessible by the conventional casting process. Examples of extruded construction elements extend from small angled profiles which have a width of only a few centimetres, up to large construction slabs which can have a width of 60 cm and in theory any desired length. Extruded cement masses comprise in principle cement as binder, possibly other binders, aggregates (sands) and/or lightweight aggregates, and also cellulose ethers, in particular methylcellulose, as water-retention agent, plasticizer and lubricant. Frequently, natural and/or synthetic fibres are also added. The water-retention agents, plasticizers and lubricants are referred to as additives hereinafter. Owing to their water-retention capacity, such additives also prevent the phase segregation between liquid and solid phases. The amount of the additives used is generally between 0.3 and 2.5%.

Due in part to the shortcomings of the art-known additives, cement extrusion is still attended by a number of disadvantages which limit its commercial use. It is known to those skilled in the art that, as additives for cement extrusion, use is made of cellulose derivatives, in particular derivatives of methylcellulose such as methyl hydroxyethylcellulose (MHEC) or methyl hydroxypropylcellulose (MHPC). However, these additives do not display the desired property profile. In particular MHPC loses its efficacy at relatively high temperatures, and other cellulose derivatives tend to lead to a high extrusion pressure and to a rough uneven surface of the extrudate.

GB-A-514,917 describes irreversibly crosslinked cellulose derivatives and a process for producing water-soluble cellulose ethers which are crosslinked with a bifunctional reagent. The purpose of GB-A-514,917 was to produce cellulose ethers which have an unusually high viscosity in water. Preferably, the products exhibit a viscosity increase of 400%.

U.S. Pat. No. 4,321,367 likewise describes a process for preparing crosslinked cellulose ethers, again with the purpose of providing products having increased viscosity in aqueous solution. Preferably, the viscosity of a 2% strength by weight solution is increased by at least 50%; in the most preferred variant, the viscosity of a 2% strength by weight solution is increased by at least 100%.

In these publications, while irreversibly crosslinked cellulose derivatives are disclosed, they are not described in ranges which would impart the desired theological properties. Also, none of these publications suggests the use of such products in cement extrusion or even describe the degrees of substitution suitable for such products.

Hence, there is still no prior art additive which solves the problems occurring in cement extrusion. There is, therefore, an urgent requirement to provide improved additives which exhibit water-retention capacity at high temperatures, lower the extrusion pressure in cement extrusion, enhance the surface quality of the extrudate, permit a high exit velocity, and achieve shape stability of the extrudate.

It was an object of the present invention to provide improved additives for the extrusion of construction materials which avoid the problems described.

SUMMARY OF THE INVENTION

Surprisingly, it has now been found that cellulose derivatives having gel-like theological properties can overcome these disadvantages.

The invention, therefore, relates to additives for the extrusion of construction material systems, the additives comprising irreversibly crosslinked cellulose derivatives having gel-like theological properties. By the term cellulose derivatives is meant cellulose ethers as described below.

DETAILED DESCRIPTION OF THE INVENTION

Conventional commercially available cellulose derivatives which are soluble in water, for example methyl hydroxyethylcellulose, methyl hydroxypropylcellulose and hydroxyethylcellulose, exhibit a characteristic rheological profile which is describable on the basis of material functions of the aqueous solution of the cellulose derivative. Aqueous solution means in this case a system which comprises water, cellulose derivative and, where present, salts and accompanying substances from the cellulose derivative and the water used, for example mains water. Material functions which are under discussion are customarily the viscosity $\eta$ as a function of the shear rate $\dot{\gamma}$ for describing the flow properties, and also the shear storage modulus $G'$ and the shear loss modulus $G''$, in each case as a function of the angular frequency $\omega$, for describing the linear-viscoelastic properties.

The symbols used here follow the recommendations of the publication: C. L. Sieglaff: "Proposed Nomenclature for Steady Shear Flow and Linear Viscoelastic Behavior", Transactions of the Society of Rheology 20:2 (1976) 311–317.

In the case of viscosity, generally the overall function $\eta(\dot{\gamma})$ is not reported, but a representative viscosity value which is determined under defined conditions with respect to concentration of the cellulose derivative in the aqueous solution, the temperature and the shear rate, and to the measuring instrument used and the instrument settings. This procedure is well known to those skilled in the art. It is also generally known that in most cases the viscosity of the aqueous solution of a cellulose derivative decreases with increasing shear rate; the aqueous solutions thus have a pseudoplastic flow behaviour.

The linear-viscoelastic properties are determined by measurements in an oscillating shear flow at low amplitude and variable angular frequency. The values for G' and G" are determined here greatly by the concentration of the cellulose derivatives in the aqueous solution and by the height of the representative viscosity value. Therefore, hereinafter, only the relative course of G' and G" with increasing angular frequency $\omega$ is considered. At a concentration of 1.5 to 2 parts by weight of cellulose derivative per 100 parts by weight of the aqueous solution and at a temperature of approximately 20° C., the course of G' and G" for the cellulose derivatives of the prior art is such that at low angular frequency $\omega$ the shear storage modulus G' is less than the shear loss modulus G", but with increasing angular frequency, G' increases more greatly than G". Here, it can also be the case that G', above a certain angular frequency, finally becomes greater than G"; the solution thus reacts predominantly elastically at high values of angular frequency.

For conventional cellulose derivatives, in aqueous solution the dependence on the angular frequency is therefore markedly greater for G' than for G"; in particular the linear-viscoelastic material functions shear storage modulus G' and shear loss modulus G", in the range of angular frequency $\omega$ from 0.1 s$^{-1}$ to 1 s$^{-1}$, depend on the angular frequency in such a manner that the exponents n and m of the relationships (1) G'$\propto \omega$m (shear storage modulus is proportional to the angular frequency to the power n)

and (2) G"$\propto \omega$m (shear loss modulus is proportional to the angular frequency to the power m)

differ markedly, with the ratio of n to m being greater than 1.20 for the cellulose ethers of the prior art.

An optimum establishment of the rheological properties of aqueous systems can, in addition to the viscosity increase possible by the use of cellulose derivatives, also require the development of gel-like properties. Here, for example, methyl hydroxyethylcellulose or methyl hydroxypropylcellulose, which have a thermal flocculation point in water, offer the possibility of forming gels temperature-dependently; see N. Sarkar: "Kinetics of thermal gelation of methylcellulose and hydroxypropylmethylcellulose in aqueous solutions", Carbohydrate Polymers 26 (1995) 195–203. The dependence on the angular frequency is no longer markedly greater for G'in gel-like systems than for G".

Achievement of the gel-like properties by utilizing the thermal flocculation point with establishment of defined temperatures means a marked limitation for the use of cellulose derivatives from two aspects: first it is necessary to establish, with certain expenditure, the temperatures suitable for achieving the gel-like properties in use. Secondly, the choice of cellulose derivatives is limited to the products which have a flocculation point in the desired temperature range.

In the case of cement extrusion, in addition it must be assumed that the thermal flocculation or gelation of the cellulose ether is causally related to unwanted phenomena, such as sharply increasing extrusion pressure and marked impairment of the extrusion result if a critical temperature dependent on the cellulose ether used is exceeded. The temperature-dependent gel formation can therefore, in the case of cement extrusion, in principle not be used advantageously.

The partial or complete replacement of cellulose derivatives by other hydrocolloids which are able to achieve gel-like properties is often not desirable, since as a result certain properties of the cellulose derivatives, for example good water retention, are no longer completely available. Also, such hydrocolloids are generally not based on renewable raw materials or are not biodegradable.

The term "gel-like rheological properties" is here defined by the dependence of the linear-viscoelastic material functions shear storage modulus G' and shear loss modulus G" on the angular frequency $\omega$, following the definition of the "gel point" known from work by Chambon and Winter [see: F. Chambon, H. H., Winter: "Linear Viscoelasticity at the Gel Point of a Crosslinking PDMS with Imbalanced Stoichometry", Journal of Rheology 31 (8) (1987) 683–697]; there the gel point is described as the point where the frequency dependence of G' and G" can be described by the relationships:

(1) G'$\propto \omega$n (shear storage modulus is proportional to the angular frequency to the power n)

and (2) G'$\propto \omega$m (shear loss modulus is proportional to the angular frequency to the power m)

and the exponents n and m are equal, or the ratio of n to m reaches a value of 1. The values of G' and G" can differ here, it is only of importance that the logarithm of G' and the logarithm of G" in each case plotted against the logarithm of $\omega$ have the same gradient, in which case we are only considering here the range of angular frequency $\omega$ from 0,1 s$^{-1}$ to 1 s$^{-1}$. Following this definition, the cellulose derivatives having gel-like rheological properties ought to have a ratio of n to m which is close to 1 or approaches this value markedly more closely than is the case for conventional cellulose derivatives; in particular, the ratio of n to m should be less than or equal to 1.20. At the same time, the ratio of n to m should not be markedly lower than a value of 1: in the case of cement extrusion it has been found that the gel-like properties are already no longer advantageously effective when the ratio of n to m is below a value of 0.90.

Irreversibly crosslinked cellulose ethers having gel-like rheological properties are obtainable by a) alkalizing cellulose with aqueous alkali metal hydroxide solution in the presence of a suspension medium, b) reacting the alkalized cellulose with one or more alkylene oxides, c) then reacting it with an alkyl halide present in the suspension medium, d) subsequently or simultaneously reacting the alkalized cellulose with a crosslinker in an amount of 0.0001 to 0.05 eq, where the unit "eq" represents the molar ratio of the crosslinker relative to the anhydroglucose unit (AGU) of the cellulose used, and e) after, if appropriate, further addition of alkali metal hydroxide and/or alkylating agent, separating off the resultant irreversibly crosslinked cellulose derivative from the reaction mixture, if appropriate purifying it and drying it.

Such gel-like rheological properties are distinguished by the fact that the linear-viscoelastic material functions shear storage modulus G' and shear loss modulus G" of a solution of 1.5 to 2.0 parts by weight of the cellulose ether per 100 parts by weight of solution at a temperature of 20° C. +/−1° C., and when water is used as solvent without further additives, in the range of angular frequency to from $0.1\ s^{-1}$ to $1\ s^{-1}$ depend on the angular frequency in such a manner that the exponents n and m of the relationships (1) $G' \propto \omega n$ (shear storage modulus is proportional to the angular frequency to the power n)

and (2) $G'' \propto \omega m$ (shear loss modulus is proportional to the angular frequency to the power m)

are approximately equal, with for the cellulose ethers of this invention the ratio of n to m being 0.90 to 1.20.

The linear-viscoelastic material functions G' and G" of an aqueous solution of the cellulose ethers are determined using a commercially available rotating and oscillating rheometer in the oscillation mode. Such a rheometer is a measuring instrument using which, for a sample, such as in this case cellulose ether solution, the relationship between mechanical deformation and mechanical stress can be determined; depending on the type of rheometer, deformation or stress can be preset and the other respective parameter measured. For this a suitable amount of the cellulose ether solution is introduced into the measuring apparatus. Particularly suitable measuring apparatuses are combinations of cone and plate or parallel plate. Measuring apparatuses of beaker and cylinder are likewise suitable in principle but, because of the generally higher moment of inertia of the rotating body for measurements in the oscillation mode, are not ideal.

After charging, the cellulose ether solution is tempered for a time to establish defined boundary conditions for the measurement.

Measurement in the oscillation mode is then performed such that, using the rheometer control, a shear deformation $\gamma^*$ of the sample oscillating sinusoidally in the course of time (time depicted by the symbol: t) is established, characterized by the deformation amplitude $\gamma 0$ and the angular frequency $\omega$:

$$\gamma^* = \gamma 0\ \sin(\omega t)$$

The deformation amplitude $\gamma 0$ describes the maximum deformation occurring during oscillation, that is to say $\gamma^*$ changes during an oscillation cycle between the extreme values $+\gamma 0$ and $-\gamma 0$. The period of a complete oscillation cycle is $2\pi$ times the reciprocal of the angular frequency $\omega$, that is to say the oscillation proceeds in a shorter time, the higher the angular frequency is set.

The mechanical stress $\sigma^*$ generated in this operation oscillates with the stress amplitude $\sigma 0$, likewise sinusoidally in the course of time and with the same angular frequency as the deformation $\gamma^*$, but displaced by the phase angle $\delta$:

$$\sigma^* = \sigma 0\ \sin(\omega t + \delta)$$

Depending on the viscoelastic properties of the sample, the phase angle takes values from 0 to $\delta/2$, where $\delta=0$ is the limit case for ideal purely elastic behaviour, and $\delta=\pi/2$ is the limit case for ideal purely viscous behaviour.

The determination of linear-viscoelastic material functions requires that, in advance, the range of the deformation amplitude $\gamma 0$ is determined where, for the sample under test, there is a linear relationship between deformation amplitude and stress amplitude and the phase angle virtually does not change with the deformation amplitude. These conditions are generally complied with well when the deformation amplitude is chosen to be sufficiently small.

The data can then be converted directly into the linear-viscoelastic material functions shear storage modulus G' and shear loss modulus G":

$G' = \sigma 0/\gamma 0\ \cos\delta$ (shear storage modulus is equal to stress amplitude divided by deformation amplitude, multiplied by the cosine of the phase angle)

and $G'' = \sigma 0/\gamma 0\ \sin\delta$ (shear loss modulus is equal to stress amplitude divided by deformation amplitude, multiplied by the sine of the phase angle)

At constant temperature, G' and G", for a given cellulose ether solution, depend only on the angular frequency $\omega$. From the course of the linear-viscoelastic material functions shear storage modulus G' and shear loss modulus G" with variation of the angular frequency $\omega$, conventional cellulose ethers and cellulose ethers having gel-like Theological properties can clearly be differentiated.

The gel-like rheological properties of the inventively used cellulose ethers are found not only for solutions in water without further additives, but also for solutions in a solvent of 98 parts by weight of water and 2 parts by weight of sodium hydroxide per 100 parts by weight of solvent.

In this case, the solutions of the inventively used cellulose ethers, for the exponents n and m of the relationships:

(1) $G' \propto \omega n$ (shear storage modulus is proportional to the angular frequency to the power n), and (2) $G'' \propto \omega m$ (shear loss modulus is proportional to the angular frequency to the power m), and have a ratio of n to m which is in the range from 0.90 to 1.20. For preferred inventive cellulose ethers used, the ratio of n to m is from 0.95 to 1.20, particularly preferably from 0.98 to 1.18. Still more preferred cellulose ethers have a ratio of n to m of from 0.98 to 1.15; the ratio of n to m for the most preferred cellulose ethers is in the range from 1.00 to 1.12.

It is likewise characteristic that the ratio of n to m changes only slightly when the solvent is changed. In this case, the choice of the solvents A: water or B: 98 parts by weight of water and 2 parts by weight of sodium hydroxide per 100 parts by weight of solvent has an only slight effect on the ratio of the two exponents n and m, the difference of the ratio of n to m in solvent A to the ratio of n to m in the solvent B under otherwise identical conditions being less than 20 percent of the mean value of the ratio of n to m in the solvent A and the ratio of n to m in the solvent B. For inventive cellulose ethers preferably used, the corresponding difference is then 15 percent, particularly preferably less than 10 percent, and for the most preferred cellulose ethers, less than 8 percent of the mean of the ratio of n to m in the solvent A and the ratio of n to m in the solvent B.

This rheological profile can be set by cellulose derivatives which have been irreversibly crosslinked using one or more polyfunctional reagents (also called crosslinkers). The crosslinking can be carried out before or after the etherification reaction to give the water-soluble cellulose derivative. However, preference is given to the simultaneous etherification using the crosslinker and reagents which then effect the water solubility.

The inventive irreversibly crosslinked cellulose derivatives can, if appropriate, in addition be reversibly crosslinked using aldehydes, for example glyoxal during the dissolution process in water. As such the former is made slow-dissolving.

Crosslinkers which can be used are polyfunctional compounds, preferably compounds being used which have available halogen groups or epoxy groups or unsaturated groups, so that in the reaction, ether bonds are made. Preferably, bifunctional compounds are used selected from the group consisting of 1,2-dichloroethane, 1,3-dichloropropane, dichlorodiethyl ether, diglycidyl ether, phosphonic acid diglycidyl ester, divinyl sulphone. Compounds which bear two different functional groups can likewise be used. Examples of these are glycidyl methacrylate, epichlorohydrin and epibromohydrin. A particularly preferred crosslinking agent is epichlorohydrin.

The amount of the crosslinker used is from 0.0001 to 0.05 eq, where the unit "eq" is the molar ratio of the respective crosslinker relative to the anhydroglucose unit (AGU) of the cellulose used. The preferred amount of the crosslinker used is from 0.0005 to 0.01 eq. The particularly preferred amount of the crosslinker used is from 0.001 to 0.005 eq.

The inventively used cellulose derivatives are preferably cellulose ethers, the water solubility of which is achieved by the etherification with hydroxyalkyl groups and/or with alkyl groups. Preferably, the cellulose derivatives are derivatives of hydroxyethylcellulose (HEC) or of methylcellulose (MC). In particular, the MC is preferably used as a mixed ether with hydroxyalkyl groups (methyl hydroxyalkylcelluloses). Mixed ethers of methylcellulose mentioned here are, in particular, methyl hydroxyethylcellulose (MHEC), methyl hydroxypropylcellulose (MHPC) and methyl hydroxyethyl hydroxypropylcellulose (MHEHPC). Mixed ethers of HEC mentioned in particular are ethyl hydroxyethylcellulose and ethyl methylhydroxyethyl cellulose.

Alkyl substitution, in cellulose ether chemistry, is generally described by the DS. The DS is the average number of substituted OH groups per anhydroglucose unit. The methyl substitution is reported, for example, as DS (methyl) or DS (M).

Customarily, the hydroxyalkyl substitution is described by the MS. The MS is the average number of moles of the etherification reagent which are ether-bound per mole of anhydroglucose unit. Etherification with the etherification reagent ethylene oxide is reported, for example, as MS (hydroxyethyl) or MS (HE). Etherification with the etherification reagent propylene oxide is accordingly reported as MS (hydroxypropyl) or MS (HP).

The side groups are determined on the basis of the Zeisel method (reference: G. Bartelmus and R. Ketterer, Z. Anal. Chem. 286 (1977) 161–190).

Preferably, however, irreversibly crosslinked mixed ethers of methyl hydroxyethylcellulose are used for cement extrusion, preferably DS (M) values of from 1.2 to 1.7 and MS (HE) values of from 0.15 to 0.65 being set. Particularly preferably, in the case of MHEC, DS (M) values of from 1.3 to 1.6 and MS (HE) values of from 0.25 to 0.55 are set. Most preferably, in the case of MHEC, DS (M) values of from 1.35 to 1.55 and MS (HE) values of from 0.3 to 0.5 are set.

Suitable starting materials for the etherification are ground wood pulp and ground linters cellulose or mixtures of these.

Additives according to the invention are additives which comprise cellulose derivatives having gel-like rheological properties. Such additives comprise from 1 to 100%, preferably from 10 to 100%, particularly preferably from 50 to 100%, most preferably from 90 to 100%, cellulose derivatives having gel-like Theological properties. Further constituents of such additives for cement extrusion can originate from the group of non-irreversibly crosslinked cellulose derivatives or other water-soluble polymers based on renewable raw materials or else synthetic polymers. Preferably, such compounds consist of more than 90% cellulose derivatives, particularly methylcellulose derivatives, in particular MHEC.

The invention further relates to the use of irreversibly crosslinked cellulose derivatives as additives (plasticizers) in the extrusion of construction material systems.

The invention further relates to a process for the extrusion of construction materials, in which irreversibly crosslinked cellulose derivatives having gel-like rheological properties are used as additive (plasticizer). Preferably, the process is a process for the extrusion of mineral masses, in particular for cement extrusion.

The extrusion of mineral masses is a process for shaping pasty binder-containing mixtures into any desired profiles by pressing through a die mouth. Extruded masses comprise, as constituents, in principle at least one binder, in addition aggregates (for example sands, mineral flours) and/or lightweight aggregates.

Binders here are taken to mean all mineral binders such as cement, gypsum, dry hydrate, quicklime, clay loam, silicates, special fly ashes and ceramic binders.

Aggregates here are taken to mean all types of sands and stone flours, as are customarily used in construction materials. These are in particular gravels, sands, stonechips, ashes and flours based on quartz, lime (calcium carbonate), dolomite, kaolin, marble, glass, various types of builder's rubble, special fly ashes, clays, bentonites and other layer silicates. Lightweight aggregates are aggregates of particularly low density. These can be of mineral origin, for example perlite (expanded clay), expanded glass, expanded calcium silicates or high-porosity natural sands based on quartz or lime, but they can also be of organic origin, such as expanded polystyrene, polyurethane foam, cork, etc.

Fibres here are taken to mean all types of natural fibres or synthetic fibres, for example fibres based on cellulose, bamboo, coconut, polyethylene, polypropylene, polyamide, polyacrylonitrile, carbon, glass, ceramic and other mineral fibres. Their fibre lengths and fibre thicknesses can be varied over wide ranges to achieve certain product properties. Preferably, cellulose fibres and/or polypropylene fibres are used in an amount of from 0 to 20% by weight, preferably from 0 to 12% by weight, particularly preferably from 2 to 8% by weight, in each case based on the total mass of the dry components.

The formulation according to this invention can comprise, in addition to cellulose derivatives, as additive, if appropriate also further components, such as liquefier/flow agent, for example sulphonates based on melamine or naphthalene and also polyethers or such as hydrophobicizing agents and lubricants, for example poly(ethylene oxide) or related polymers.

The inventive process is carried out by mixing all raw materials with one another in any sequence. Generally, all dry components are first premixed dry, then admixed with an amount of water defined in preliminary experiments and mixed to achieve a homogeneous paste. However, it is also possible to admix the dry materials with an aqueous solution of the additive (plasticizer) or to mix all components and the water at the same time. It is likewise possible to add a portion or all of the sands/aggregates having a moisture of less than 10%.

After all components have been mixed with one another, they are then compressed in a single- or twin-shaft extruder and pressed through a die relief. It is possible to use extruders with or without a vacuum chamber and extruders with or without cooling. Between mixing and extruding, a kneading step can also be connected.

From 0.3 to 2.5% by weight of the additive, based on the total mass of the dry materials, are used. Preferably, 0.4 to 2.0% by weight of the additive are used, particularly preferably 0.5 to 1.5% by weight.

The examples hereinafter are to illustrate the inventive use, without limiting the invention:

EXAMPLES

Example 1

Comparative Example

In an autoclave, approximately 20 kg of ground wood pulp (moisture: 3.6% by weight; intrinsic viscosity in cupriethylenediamine: 1558 ml/g) and approximately 20 kg of ground cotton linters (moisture: 4.2% by weight; intrinsic viscosity in cupriethylenediamine: 1753 ml/g) are made inert by evacuation and blanketing with nitrogen. Then approximately three times the amount of dimethyl ether, comprising 2.0 mol eq of chloromethane, is metered into the reactor. Then, 2.2 mol eq of sodium hydroxide in the form of a 50% strength by weight aqueous sodium hydroxide solution are sprayed onto the cellulose with mixing, and the reaction system is alkalized by this means. The metering of the aqueous alkali and the alkalization proceed with a temperature rise from room temperature to approximately 40° C. Then, 0.66 mol eq of ethylene oxide are metered into the reactor. At this point there is heating of the mixture to above 60° C. Then, the mixture is heated to approximately 80° C. At this temperature, 2.0 mol eq of chloromethane are metered into the reactor and reacted with the reaction mixture. Then, the volatile constituents are distilled off and the reactor is evacuated.

The crude product is subjected to a wash with hot water, then dried and ground.

The degree of substitution of the resultant methyl hydroxyethylcellulose by methyl groups (DS-M) was 1.48; the degree of substitution by hydroxyethyl groups (MS-HE) was 0.40. The NaCl content was 2.3% by weight.

Example 2

Like the synthesis in Example 1, but following the alkalization, 0.001 mol eq of epichlorohydrin dissolved in 2.5 l of dimethoxyethane are metered into the reactor.

The degree of substitution of the resultant irreversibly crosslinked methyl hydroxyethylcellulose by methyl groups (DS-M) was 1.42, and the degree of substitution by hydroxyethyl groups (MS-HE) was 0.43. The NaCl content was 3.6% by weight.

Measurements for the Examples

The methyl hydroxyethylcelluloses (MHEC) from Example 1 (measurement 1) and Example 2 (measurement 2) were dissolved in water: 1.5 parts by weight of MHEC and 98.5 parts by weight of water.

The dissolution method is the same for all measurements and examples: the amount of cellulose ether weighed out is sprinkled slowly into the previously weighed amount of solvent at room temperature with stirring to avoid the formation of lumps. The round glass vessel used as container for the solution is tightly sealed with a lid and repeatedly shaken by hand to distribute still undissolved portions of cellulose ether. The further dissolution operation is performed within 24 hours, the round glass vessel being turned slowly, horizontally, about its longitudinal axis. In this manner all parts of the interior of the glass vessel are continuously wetted by the liquid.

After the dissolution operation, the glass vessel containing the cellulose ether solution is allowed to stand upright for some hours so that any air bubbles distributed in the solution ascend and can escape from the solution.

The cellulose ether solution is then characterized rheologically; the procedure is the same for all measurements and examples: directly before the study with the rheometer, the glass vessel is opened and the required amount of cellulose ether solution is taken from the glass vessel and charged into the measuring apparatus of the rheometer. The measuring apparatus is placed into the position required to carry out the measurement. Before the start of measurement the time required for the cellulose ether solution in the measuring apparatus to reach a temperature of 20° C. is allowed to pass; the temperature is controlled in accordance with the temperature display of the rheometer. The deviations owing to the uncertainty in calibration of the temperature measurement are small and, for a temperature display of 20° C., are a maximum of +/−1° C. The variation in the temperature display during the measurement is a maximum of +/−0.2° C.

During the measurement, the angular frequency ω is varied in such a manner that in total 6 measurement points are in the range ω from $0.1 \text{ s}^{-1}$ to $1 \text{ s}^{-1}$. The deformation amplitude γ0 is in this case between 0.0025 and 0.0075, which, in all cases observed, was sufficiently small to determine the material functions shear storage modulus G' and shear loss modulus G" safely in the linear-viscoelastic range.

The results of the rheological measurement 1 for Example 1 (comparative example) are given in Table 1:

Measurement 1:

TABLE 1

Linear-viscoelastic material functions shear storage modulus G' and shear loss modulus G" as a function of the angular frequency ω for the methyl hydroxyethylcellulose from Example 1 (comparative example)

| ω unit: $s^{-1}$ | G' unit: Pa | G" unit: Pa |
|---|---|---|
| 0.1 | 6.64 | 13.2 |
| 0.159 | 9.78 | 17.9 |
| 0.251 | 14.8 | 23.4 |
| 0.398 | 21.5 | 30.4 |
| 0.632 | 30.6 | 37.7 |
| 1 | 42.4 | 47.6 |

Rheometer: Universal Dynamic Spectrometer UDS 200 from Physica Messtechnik GmbH, Stuttgart, Germany
Measuring apparatus: Cone/plate of 50 mm diameter, cone with 1° cone angle and 0.05 mm flattening of the cone peak The data are further analysed to determine the exponents n and m of the relationships (1) $G' \propto \omega^n$ (shear storage modulus is proportional to the angular frequency to the power n)

and (2) $G'' \propto \omega^m$ (shear loss modulus is proportional to the angular frequency to the power m)

by carrying out a regression analysis for the logarithm of the shear storage modulus G' (log G') as a function of the logarithm of the angular frequency ω (log ω), the gradient of the line corresponding to the exponent n, and also by carrying out a regression analysis for the logarithm of the shear loss modulus G" (log G") as a function of the logarithm of the angular frequency ω (log ω), the gradient of the line corresponding to the exponent m. The results of this regression analysis for Example 1 (comparative example) are given in Table 2:

TABLE 2

Regression analysis for log G' against log ω and log G" against log ω for the methyl hydroxyethylcellulose from Example 1 (comparative example), data for G', G" and ω from Table 1

| Log ω | log G' | log ω | log G" |
|---|---|---|---|
| −1 | 0.8222 | −1 | 1.1206 |
| −0.7986 | 0.9903 | −0.7986 | 1.2529 |
| −0.6003 | 1.1702 | −0.6003 | 1.3692 |
| −0.4001 | 1.3324 | −0.4001 | 1.4829 |
| −0.1993 | 1.4857 | −0.1993 | 1.5763 |
| 0 | 1.6273 | 0 | 1.6776 |
| Gradient: | 0.8107 | Gradient: | 0.5528 |
| R: | 0.9992 | R: | 0.9982 |

The gradient corresponds to the exponent n in equation (1)
The regression was performed using the known principle of the smallest sum of the squares of the errors. R is a coefficient for the quality of the regression and should always be greater than 0.95.

The gradient corresponds to the exponent m in equation (2)
The regression was performed using the known principle of the smallest sum of the squares of the errors. R is a coefficient for the quality of the regression and should always be greater than 0.95.

For the methyl hydroxyethylcellulose from Example 1 (comparative example) this gives a ratio of n to m of 1.47 (0.8107/0.5528); the product does not have gel-like rheological properties.

Measurement 2:

The results of the Theological measurement 2 for Example 2 are given in Table 3:

TABLE 3

Linear viscoelastic material functions shear storage modulus G' and shear loss modulus G" as a function of the angular frequency ω for the methyl hydroxyethylcellulose from Example 2

| ω unit: s$^{-1}$ | G' unit: Pa | G" unit: Pa |
|---|---|---|
| 0.1 | 26.5 | 17.8 |
| 0.159 | 31.6 | 20.9 |
| 0.251 | 38.1 | 25.6 |
| 0.398 | 45.1 | 29.9 |
| 0.632 | 54.3 | 35.7 |
| 1 | 64.5 | 41.3 |

Rheometer: Universal Dynamic Spectrometer UDS 200 from Physica Messtechnik GmbH, Stuttgart, Germany
Measuring apparatus: Cone/plate of 50 mm diameter, cone with 1° cone angle and 0.05 mm flattening of the cone peak The results of the regression analysis for measurement 2 are given in Table 4:

TABLE 4

Regression analysis for log G' against log ω and log G" against log ω for the methyl hydroxyethylcellulose from Example 2, data for G', G" and ω from Table 3

| Log ω | log G' | log ω | log G" |
|---|---|---|---|
| −1 | 1.4232 | −1 | 1.2504 |
| −0.7986 | 1.4997 | −0.7986 | 1.3201 |
| −0.6003 | 1.5809 | −0.6003 | 1.4082 |
| −0.4001 | 1.6542 | −0.4001 | 1.4757 |
| −0.1993 | 1.7348 | −0.1993 | 1.5527 |
| 0 | 1.8096 | 0 | 1.6160 |
| Gradient: | 0.3873 | Gradient: | 0.3706 |
| R: | 0.9999 | R: | 0.9991 |

The gradient corresponds to the exponent n in equation (1)
The regression was performed using the known principle of the smallest sum of the squares of the errors. R is a coefficient for the quality of the regression and should always be greater than 0.95.

The gradient corresponds to the exponent m in equation (2)
The regression was performed using the known principle of the smallest sum of the squares of the errors. R is a coefficient for the quality of the regression and should always be greater than 0.95.

For the methyl hydroxyethylcellulose from Example 2, this gives a ratio of n to m of 1.05 (0.3873/0.3706). The product has gel-like rheological properties.

Measurement 3:

The MHEC from Example 2 was dissolved in a solvent of 98 parts by weight of water and 2 parts by weight of sodium hydroxide per 100 parts by weight of solvent: 1.5 parts by weight of MHEC and 98.5 parts by weight of solvent. The theological measurement was carried out as described in measurement 2. The data analysis gave a ratio of n to m of 1.03.

Comparison of measurement 2 and measurement 3 shows that the MHEC from Example 2, for which gel-like properties were found (n/m=1.05) on the basis of a solution in water, also has gel-like properties in a solution in a solvent of 98 parts by weight of water and 2 parts by weight of sodium hydroxide per 100 parts by weight of solvent (n/m=1.03). The mean of the ratio of n to m from the two solvents is 1.04. The difference between the ratios n to m from the two solvents is 0.02; this difference corresponds to approximately 2 percent based on the mean of the ratios of n to m for the two solvents.

Examples of Cement Extrusion 50 parts of Portland cement 132.5, 50 parts of quartz sand, 5 parts of fibres, 0.9 parts of additive are first premixed dry then mixed with water to give a homogeneous paste, charged into the charging hopper of a single-shaft extruder, fed to the extrusion screw, evacuated in the vacuum chamber, compressed and pressed through the die relief. The table below gives the results obtained. The temperatures of the extruded masses were between 52 and 58° C.

The water content is set by preliminary experiments so that a suitable shape-stable consistency of the extrudate is given, which moreover permits a high exit velocity.

| Example | Additive | n/m (ratio of the exponents determined by rheology) | Pressing pressure at the die mouth [bar] | Parts of water | Extrudate surface | Comparison/ invention |
|---|---|---|---|---|---|---|
| 3 | MHEC from Example 1 | 1.47 (1.43) | 21–22 | 28 | O | C |
| 4 | MHEC from Example 2 | 1.05 (1.03) | 7–8 | 32 | ++ | I |
| 5 | 1/1 mixture (parts by weight) of the MHEC from Example 1 and Example 2 | 1.05 (1.03) based on the irreversibly crosslinked component | 12–13 | 30 | + | I |
| 6 | Irreversibly crosslinked MHEC DS-M: 1.40 MS-HE: 0.42 | 0.87 (0.82) | 16–17 | 29 | – | C |

++ very smooth, no cracks
+ smooth, scarcely any cracks
somewhat rough, few cracks
very rough, many cracks to friable Values for the exponent ratio n/m: data for solution of cellulose ethers in water, values in brackets for solutions in a solvent of 98 parts by weight of water and 2 parts by weight of sodium hydroxide per 100 parts by weight of solvent. The solutions each contained 1.5 parts by weight of the cellulose ether and 98.5 parts by weight of solvent.

A comparative example with the MHEC from Example 1 but an amount of 32 parts of water used did not give a shape-stable extrudate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of preparing a construction material system, comprising extruding a construction material with an additive comprising an irreversibly crosslinked cellulose derivative,
   wherein the irreversibly crosslinked cellulose derivative is prepared by a process comprising,
   (a) alkalizing cellulose with aqueous alkali metal hydroxide solution in the presence of a suspension medium,
   (b) reacting the alkalized cellulose with one or more alkylene oxides,
   (c) reacting the alkalized cellulose of step-(b) with an alkyl halide present in the suspension medium,
   (d) subsequently or simultaneously reacting the alkalized cellulose with a crosslinker in an amount of 0.0001 to 0.05 eq, where the unit "eq" represents the molar ratio of the crosslinker relative to the anhydroglucose unit (AGU) of the cellulose used, and
   (e) optionally performing at least one of steps (i), (ii), (iii) and (iv),
      (i) adding a material selected from the group consisting of alkali metal hydroxide, alkylating agent and combinations thereof,
      (ii) separating off the irreversibly crosslinked cellulose derivative from the reaction mixture,
      (iii) purifying the irreversibly crosslinked cellulose derivative, and
      (iv) drying the irreversibly crosslinked cellulose derivative.

2. The process of claim 1, wherein the construction material system is a cementitious mixture or a fibrous cementitious mixture.

3. The process of claim 1, wherein the additive is present in an amount of 0.3 to 2.5% by weight, based on the total mass of the dry materials.

4. The process of claim 1, wherein the additive comprises irreversibly crosslinked cellulose derivatives in an amount of 10 to 100% by weight.

5. The process of claim 1 wherein the cellulose derivative of said irreversibly crosslinked cellulose derivative is selected from the group consisting of hydroxyethylcellulose derivative, methylcellulose derivative, methyl hydroxypropylcellulose derivative and methyl hydroxyethylcellulose derivative.

6. The process of claim 1 wherein said additive comprises a solution comprising:
   (a) the irreversibly crosslinked cellulose derivative, present in an amount of 1.5 to 2.0 parts by weight per 100 parts by weight of solution; and
   (b) one of,
      (i) water, or
      (ii) a solvent of 98 parts by weight of water and 2 parts by weight of sodium hydroxide per 100 parts by weight of solvent.

7. The process of claim 6 wherein said solution of said irreversibly crosslinked cellulose derivative has a linear-viscoelastic material function shear storage modulus G' and a linear-viscoelastic material function shear loss modulus G" at a temperature of 20° C.+/−1° C. in the range of angular frequency ω of 0.1 s$^{-1}$ to 1 s$^{-1}$ depending on the angular frequency wherein exponents n and m of the relationships G"∝ωn (shear storage modulus is proportional to the angular frequency to the power n) and G"∝ωm (shear loss modulus is proportional to the angular frequency to the power m) are approximately equal, the ratio of n to m being from 0.90 to 1.20 for the solution.

* * * * *